(12) United States Patent
Tries et al.

(10) Patent No.: US 7,156,426 B2
(45) Date of Patent: Jan. 2, 2007

(54) ROTARY TRANSMISSION LEADTHROUGH FOR FLUID SYSTEMS

(75) Inventors: Manfred Tries, Ehingen (DE); Frank Ambrosius, Öpfingen (DE)

(73) Assignee: Tries GmbH & Co. KG, Ehingen (DE)

( * ) Notice: Subject to any disclaimer, the term of this patent is extended or adjusted under 35 U.S.C. 154(b) by 0 days.

(21) Appl. No.: 10/478,995

(22) PCT Filed: May 11, 2002

(86) PCT No.: PCT/DE02/01705

§ 371 (c)(1),
(2), (4) Date: Jan. 15, 2004

(87) PCT Pub. No.: WO02/097318

PCT Pub. Date: Dec. 5, 2002

(65) Prior Publication Data

US 2004/0113424 A1 Jun. 17, 2004

(30) Foreign Application Priority Data

May 29, 2001 (DE) ............................ 101 25 991

(51) Int. Cl.
*F16L 27/00* (2006.01)
(52) U.S. Cl. .................................................. 285/147.1
(58) Field of Classification Search ............ 285/147.1, 285/147.2, 147.3
See application file for complete search history.

(56) References Cited

U.S. PATENT DOCUMENTS

| | | | | |
|---|---|---|---|---|
| 386,881 A | * | 7/1888 | Harris et al. ............. | 285/147.1 |
| 573,280 A | * | 12/1896 | Morgan ....................... | 57/323 |
| 991,501 A | * | 5/1911 | Graves .................... | 285/147.1 |
| 1,228,541 A | * | 6/1917 | Durbin ......................... | 285/98 |
| 1,788,500 A | | 1/1931 | Uhri, Jr. | |
| 2,083,970 A | * | 6/1937 | Walter ..................... | 285/147.1 |
| 2,139,226 A | * | 12/1938 | Fuehrer ................... | 285/147.2 |
| 2,354,416 A | * | 7/1944 | Phillips ................... | 285/147.1 |
| 2,501,638 A | * | 3/1950 | Warren .................... | 285/272.1 |
| 2,717,141 A | * | 9/1955 | Livingston ............... | 248/278.1 |
| 4,362,324 A | * | 12/1982 | Kelly ......................... | 285/119 |
| 5,372,389 A | * | 12/1994 | Tam et al. .................... | 285/94 |
| 5,405,173 A | * | 4/1995 | Goughneour ............ | 285/272.1 |

FOREIGN PATENT DOCUMENTS

| | | |
|---|---|---|
| DE | 690 434 | 11/1958 |
| DE | 43 18 060 A1 | 12/1994 |

* cited by examiner

*Primary Examiner*—James M. Hewitt
(74) *Attorney, Agent, or Firm*—Breneman & Georges; William D. Breneman

(57) ABSTRACT

A rotary transmission leadthrough for fluid systems is proposed, by means of which the mobility of a fluid system is increased and new fields of application can therefore be opened up. This is achieved according to the invention in that, in addition to a first rotor rotatable about a first rotation axis, a second rotor rotatable about a second rotation axis different from the first rotation axis of the first rotor is provided.

11 Claims, 2 Drawing Sheets

ROTARY TRANSMISSION LEADTHROUGH FOR FLUID SYSTEMS

BACKGROUND OF THE INVENTION

FIELD OF THE INVENTION

Figure 1:
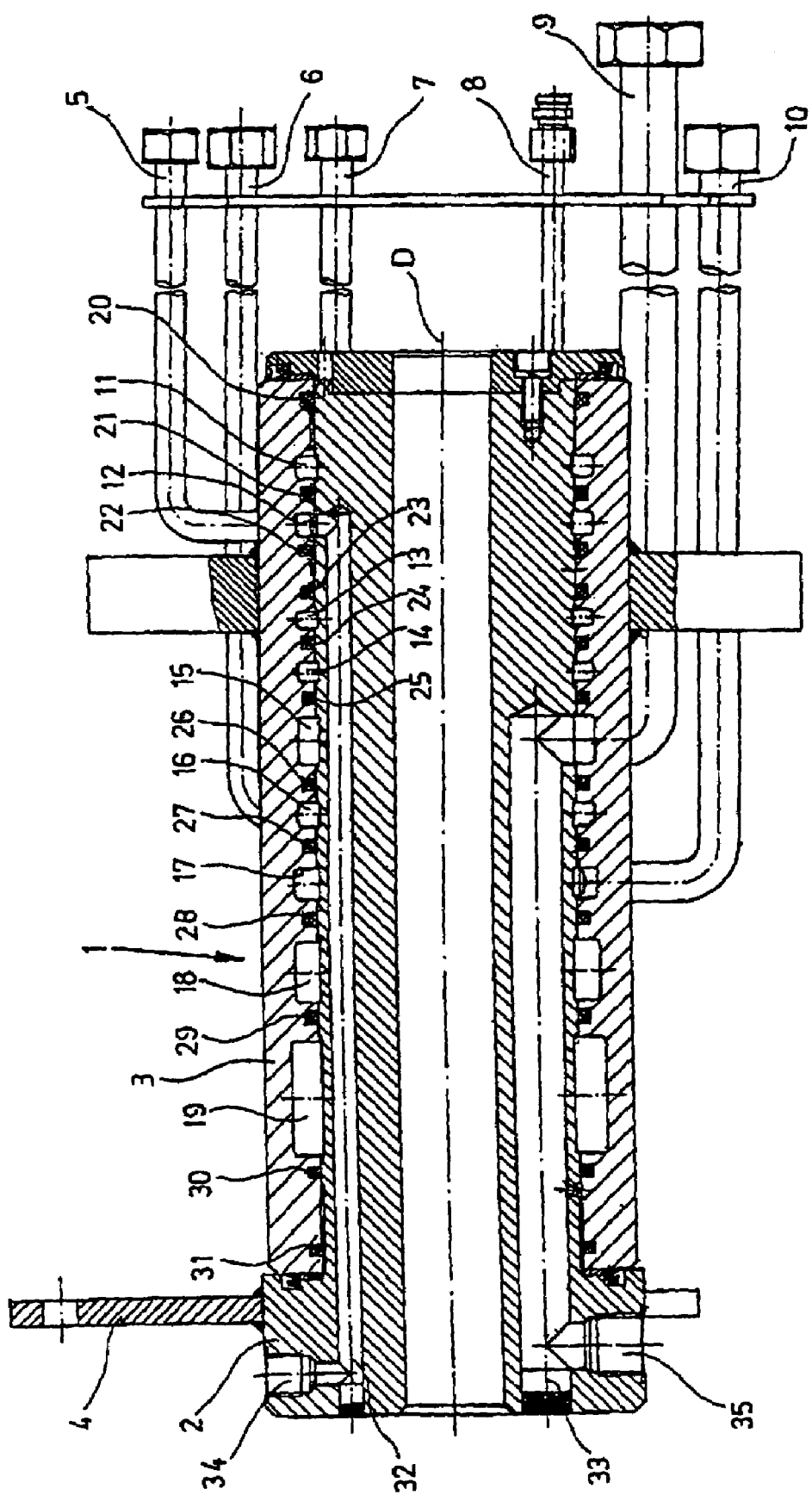

The invention relates to a rotary transmission leadthrough for fluid systems having a first rotary element designed as a first rotor and a second rotary element designed as a stator which rotary elements may be arranged at least partly coaxially to one another. More particularly the invention pertains to a rotary transmission leadthrough in which the fluid lines are led via external or internal grooves of the stator and/or of the rotor in which the external or internal grooves of the stator and/or the rotor have the shape of an annular groove or of an annular segment groove.

In fluid systems, in particular in machines or vehicles having a hydraulic drive, rotary transmission leadthroughs are used in order to ensure fluid passages between components which are movable relative to one another. Such fluid systems are used, for example, in construction machines or agricultural machines.

Known rotary transmission leadthroughs are used, inter alia, in order to permit staggering between the front and the rear axle in off-highway vehicles having a hydraulic drive, since the connections on both sides of such a rotary transmission leadthrough permit the mutual rotation about a rotation axis.

Previous off-highway vehicles are able to follow the course of an intersected terrain only to a limited extent, since, during an excessive change in the angle of inclination, the vehicle either sits on the ground or else the wheels of one axle lift from the ground at sufficient speed. Known rotary leadthrough transmissions generally consist of two rotary elements at least partly inserted one inside the other, of which one is designated as stator and the other is designated as rotor. In this case, the rotary element designated as stator is fixed with regard to the reference system, for example a machine frame, whereas the rotary element designated as rotor is rotatable with regard to this reference system. The designation "stator" and "rotor" below is merely used for distinguishing between two rotary elements, in which case, depending on the reference system, the rotary element designated as stator does not have to be statically fixed.

The fluid lines are in this case led via external or internal grooves of the stator and/or of the rotor and accordingly the external or internal grooves of the stator and/or the rotor have the shape of an annular groove or of an annular segment groove. Many different fluid lines, e.g. for hydraulic oil, compressed air, fuel, etc., can be passed through such a rotary transmission leadthrough.

The object of the invention is to propose a rotary transmission leadthrough, by means of which the mobility of a fluid system, in particular of a hydraulic system, is increased and thus new fields of application are opened up.

Based on a rotary transmission leadthrough of the type mentioned at the beginning, this object is achieved by the characterizing features of claim 1.

Advantageous embodiments and developments of the invention are possible utilizing at least one rotary element having external or internal grooves of the stator and/or the rotor and accordingly the external or internal arooves of the stator and/or the rotor have the shape of an annular groove or of an annular segment groove.

Accordingly, in a rotary transmission leadthrough according to the invention, at least one further rotor is provided which is at least partly coaxial to a part of the stator and is rotatable relative to the latter about a second rotation axis different from the first rotation axis of the first rotor.

This results in a rotary transmission leadthrough which opens up new application possibilities for the associated fluid system. Thus, for example in the case of a hydraulic system for off-highway vehicles, not only can the staggering of the axles be provided, but so too can a slewing movement between the front and rear part of the vehicle. Thus, for example, an articulated joint can be provided in such a vehicle, this articulated joint permitting articulation of the vehicle about a horizontal rotation axis. Such a vehicle is able to follow the ground contour even in extremely intersected terrain without the vehicle resting on the ground or without the wheels lifting from the ground.

In another embodiment, a rotary transmission leadthrough according to the invention, in addition to the staggering of the wheels, may also be used to permit steering movements of two axles relative to one another, as is the case in "articulated steering". Such vehicles bend during steering about a vertical rotation axis and are considerably more maneuverable than vehicles having conventional wheel steering.

A rotary transmission leadthrough according to the invention can be attached as a central construction unit for a multiplicity of fluid lines and is able to permanently ensure the requisite mobility of the fluid lines in a sealing manner even at high working pressures.

In a development of the invention, the stator is of multi-piece construction. In this way, the production and assembly of a rotary transmission leadthrough according to the invention is greatly facilitated. In particular, greater design freedom is obtained for constructional detail solutions in a rotary transmission leadthrough according to the invention. In addition, such a rotary transmission leadthrough is also more easy to maintain and repair, since it can be partly dismantled on site and repair by exchange of individual stator replacement parts is possible.

Since such multi-piece stators also have to withstand high working pressures in the installed state, a tight connection between the individual parts is absolutely necessary. In this case, flanged joints with corresponding sealing surfaces and inlaid seals have proved successful. In addition, retaining elements for fastening the rotary transmission leadthrough according to the invention on site can at the same time be attached to a flange of this kind.

In a special embodiment of the invention, the first and the second rotor are designed at least partly in a sleeve shape, so that they can enclose the corresponding mating piece of the stator. This corresponds to the type of construction of known rotary transmission leadthroughs and offers in particular the advantage of attaching various fluid lines on the outside to the rotor in different axial positions. In principle, however, the opposite type of construction is also conceivable, i.e. a sleeve-shaped configuration of the stator, one rotor or both rotors having to be inserted as inner part into such a stator in this case.

In a further advantageous embodiment of the invention, a third rotor is provided. Such a third rotor can in this case be arranged so as to be rotatable about a third rotation axis. In this case, the third rotor, depending on the application, may be rotatably connected either to the abovementioned stator or else to one of the two aforesaid rotors. To connect the third rotor to one of the two aforesaid rotors, that rotor which contains the lines to be led through must be provided with a part which is designed as a stator for the third rotor. This brings about an additional degree of freedom in the rotatability of the rotary transmission leadthrough, so that, for example, an off-highway vehicle having a rotary transmission leadthrough designed in such a way permits staggering of the axles, articulated steering and at the same time ground adaptation by an articulated joint about a horizontal axis.

In this case, the rotary transmission leadthrough according to the invention still constitutes a construction unit which can be handled as a unit and has the resulting advantages with regard to assembly, repair and the number of parts required.

However, the third rotor may also be designed in such a way that it is arranged so as to be rotatable about the same rotation axis, like one of the two aforesaid rotors. In this case, the third rotor permits greater freedom in the spatial configuration of a rotary transmission leadthrough according to the invention. As mentioned above, in a rotary transmission leadthrough for fluid systems, a very large number of fluid lines are generally rotatably coupled to one another. The corresponding passages in the rotor or in the stator are in this case arranged axially at a distance apart in an annular shape or in an annular segment shape. If the length of a rotor and of the associated stator part is restricted for design reasons, reliable leadthrough of further fluid passages can be ensured by attaching a further rotor.

In addition, while retaining a large number of fluid passages, a more favorable weight distribution, depending on the application, can be achieved by means of a further third rotor. If, for example in an advantageous embodiment, a second and a third rotor which are arranged on both sides of a stator are combined with the first rotor in a cross shape or a T shape, a position of the center of gravity is obtained in the vicinity of the center axis of the rotary transmission leadthrough in the longitudinal direction of the first rotor. Such a weight distribution is advantageous, for example, during use in vehicles in order to ensure a balanced driving performance in curves or in a location on a slope.

In addition, in a special embodiment of a fluid leadthrough according to the invention, a leakage-fluid return, e.g. for leakage oil, is integrated in the rotary transmission leadthrough. This is generally advantageous in all types of hydraulic system, since the external tightness of the rotary transmission leadthrough is markedly improved by this measure.

The external tightness is especially important in particular during use in a vehicle, since not only is the external appearance of the rotary transmission leadthrough affected, but the oil losses are also markedly reduced, if not completely avoided. Oil losses are undesirable in vehicles in particular for reasons of environmental contamination. In addition, excessive oil losses must be regularly supplemented in the oil supply.

One or more leakage-fluid returns are advantageously provided in the region of the rotary transmission leadthrough between a pressure line and the outer region. By the pressureless leakage-fluid return, pressurized lines are to a certain extent screened from the outside further in the interior of the rotary transmission leadthrough. The external tightness of the rotary transmission leadthrough in this arrangement can ultimately only be produced between the pressureless leakage-fluid line and the external environment. However, the sealing of a pressureless line can be realized in a considerably simpler and better manner than is the case with high-pressure lines.

An exemplary embodiment of the invention is shown in the drawing and explained in more detail below with reference to the figures.

Figure 2:
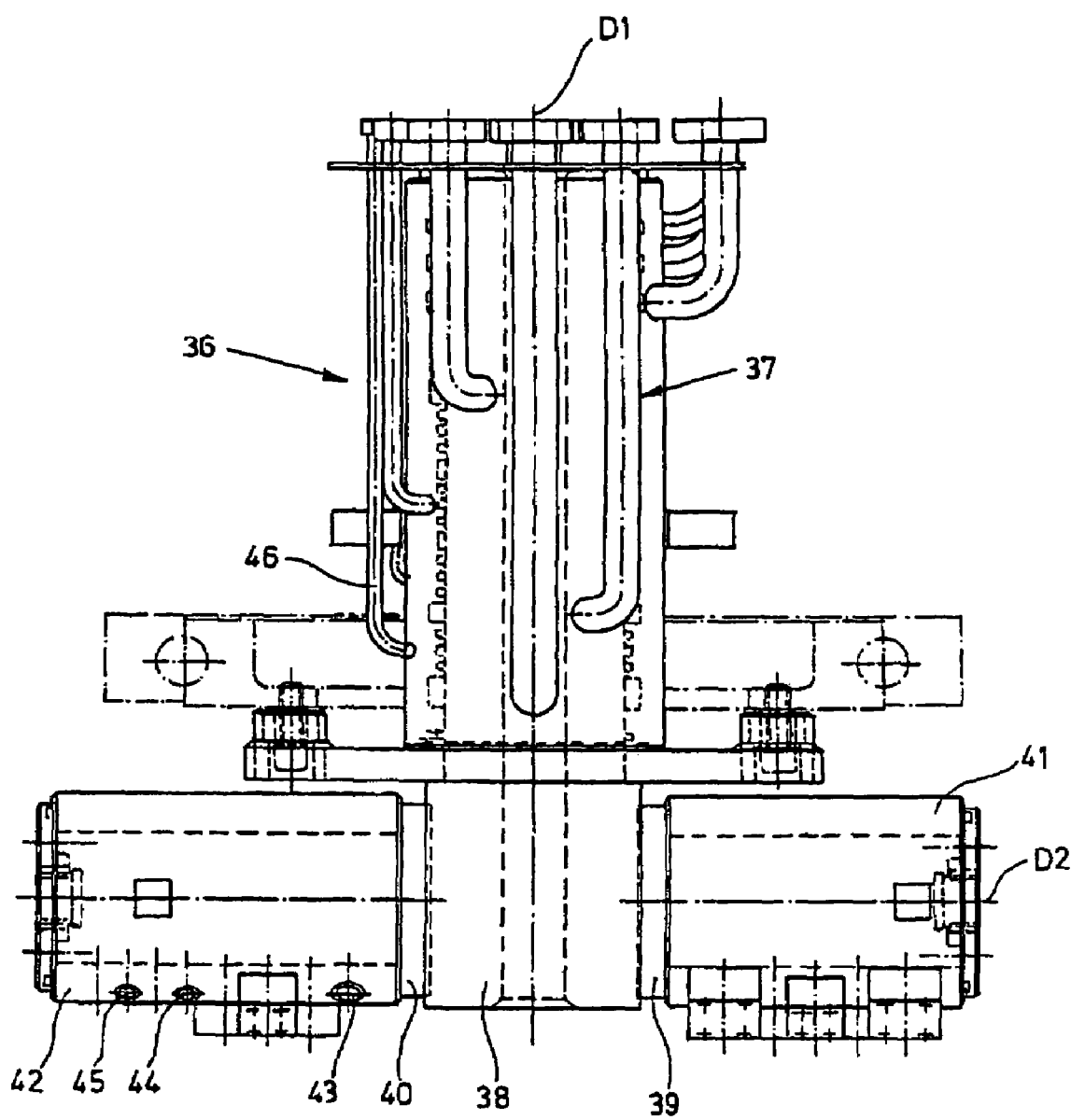

In the drawing, in detail:

FIG. 1 shows a longitudinal section through a rotary transmission leadthrough for a fluid system, and FIG. 2 shows a plan view of a rotary transmission leadthrough according to the invention.

In this case, the rotary transmission leadthrough 1 comprises two rotary parts—a stator 2 and a rotor 3. The stator 2 is provided with a flange 4, by means of which the rotary transmission leadthrough can be fastened on site.

The rotor 3 is of sleeve-shaped design and is pushed onto the stator 2. The rotor 3 is therefore rotatable with regard to the rotation axis D relative to the stator 2.

Attached to the rotor 3 are various connections 5 to 10 which, in a manner not shown in any more detail, open into various annular grooves 11 to 19 of the rotor 3. The annular grooves 11 to 3 are sealed off from one another and from the outer environment by means of seals 20 to 31. Each of the annular grooves 11 to 19 is extended via axially parallel bores in the stator 2 and via corresponding radial bores in the end region of the stator 2. The axially parallel bores 32 and 33 are shown by way of example, these bores 32 and 33 being directed outward with the respectively associated radial bores 34 and 35 via the stator 2.

The exemplary embodiment shown shows how a plurality of lines having cross sections of different size are led through a rotary transmission leadthrough. Thus, for example, the connection 5 of the rotor 3 is connected to the annular groove 12. Irrespective of the angular position of the rotor 3 with respect to the stator 2, a connection between the connection 5 and the axially parallel bore 32 and thus to the radial bore 34 is therefore obtained. The radial bore 34 can be used, for example, as a stator-side external connection via an internal thread. In the same way, the connection 9 is led through via the annular groove 15, the axially parallel bore 33 and the radial bore 35 irrespective of the angular position of the rotor 3 with regard to the stator 2.

The external sealing of such a rotary transmission leadthrough can advantageously be improved by a leakage-oil return being provided in such a way that the passages carrying high pressure are screened to the outside by the leakage-oil return. In hydraulic systems, there are definitely pressures in the order of magnitude of several hundred bar. For example, if the high-pressure lines are connected in the present case via the annular grooves 16, 17, 18 to various high-pressure pumps, e.g. a crane hydraulic pump, a slewing-gear pump and an auxiliary pump, a leakage-oil return is advantageously provided in the outer region for this, e.g. in the adjacent annular groove 15, in order to catch leakage oil there from the pressure lines. The lines adjoining further on the outside may be used for low-pressure passages, for example for one or more compressed-air or fuel lines.

A hydraulic-oil return line 19 is arranged with a large cross section on the other side of the high-pressure lines 16, 17, 18, which hydraulic-oil return line 19 likewise constitutes a low-pressure line and may at the same time serve as a leakage-oil return.

By the screening of the hydraulic high-pressure lines by means of leakage-oil return lines, the external tightness of the rotary transmission leadthrough is decisively improved.

FIG. 2 now shows a rotary transmission leadthrough 36 according to the invention having a first rotor 37 and a stator 38, the first rotor 37 and also that part of the stator 38 which is located in the region of the first rotor 37 corresponding to the construction of a rotary transmission leadthrough described with reference to FIG. 1.

The stator 38 now has two extensions 39, 40 which extend outward transversely to the rotation axis $D_1$ on both sides of the stator 38. A second rotor 41 and a third rotor 42 are pushed onto the extensions 39, 40.

The extensions 39, 40 of the stator 38, in accordance with the construction of the rotary transmission leadthrough according to FIG. 1, have axially parallel bores (not shown in any more detail) with regard to the rotation axis $D_2$, which are connected to axially parallel passages (likewise not shown in any more detail) with regard to the rotation axis $D_1$. The passages which are attached in the region of the first rotor 37 in the stator and are axially parallel with regard to the rotation axis $D_1$ branch, as it were, into the two extensions 39, 40 into the regions of the second rotor 41 and the third rotor 42.

There, in a corresponding manner, as shown with reference to the rotary transmission leadthrough according to figure 1, the lines are again directed outward via annular grooves which, in the present embodiment, are made in the rotors 41, 42. The connections may be effected via radial connection openings of the second or third rotor 41, 42, respectively. Three of such connection openings 43 44, 45 are depicted by way of example on the third rotor 42. The connections may be produced in a suitable manner, for example via flanged joints or screw-in threads.

A rotary transmission leadthrough according to the invention permits the rotation of the connections on both sides about two rotation axes $D_1$, $D_2$. For example, if the connection 46 of the first rotor 37 is connected to the connection opening 44 of the third rotor 42, it can immediately be recognized with reference to the exemplary embodiment shown that the connection opening 44 is rotatable relative to the connection 46 about both the rotation axis $D_1$ and the rotation axis $D_2$.

The arrangement of the second and third rotor 41, 42 on both sides of the stator 38 results in a T shape or cross shape, so that the center of gravity of the rotary transmission leadthrough 36 lies in the vicinity of the rotation axis $D_1$. Deviations from this result from the different design of the second or third rotor 41, 42 and of the associated stator parts.

The rotary transmission leadthrough according to the invention can be used, for example, in an off-highway vehicle having a hydraulic drive, the front part of which can swivel relative to the rear part about the rotation axis $D_2$, in which case the front part and the rear part of such a vehicle or its wheel axles can at the same time be staggered about the rotation axis $D_1$. An off-highway vehicle having a hydraulic drive can therefore be created with a rotary transmission leadthrough 36 of the type described, since it can follow the ground contour even in extremely intersected terrain without the vehicle resting on the ground between the axles or without the wheels losing ground adhesion.

In this case, the rotary transmission leadthrough 36, just like the rotary transmission leadthrough 1, can be used not only for leading through hydraulic lines but at the same time for leading through further fluid lines, for example fuel lines, compressed-air lines, etc. The complete fluid system of a machine or of a vehicle can be passed through such multiple rotary transmission leadthroughs.

List of Designations:
1 rotary transmission leadthrough
2 stator
3 rotor
4 flange
5 connection
6 connection
7 connection
8 connection
9 connection
10 connection
11 annular groove
12 annular groove
13 annular groove
14 annular groove
15 annular groove
16 annular groove
17 annular groove
18 annular groove
19 annular groove
20 seal
21 seal
22 seal
23 seal
24 seal
25 seal
26 seal
27 seal
28 seal
29 seal
30 seal
31 seal
32 axially parallel bore
33 axially parallel bore
34 radial bore
35 radial bore
36 rotary transmission leadthrough
37 first rotor
38 stator
39 extension
40 extension
41 second rotor
42 third rotor
43 connection opening
44 connection opening
45 connection opening
46 connection

The invention claimed is:

1. A rotary transmission leadthrough for a fluid system for a hydraulic system, having a first rotary element designated as a first rotor and a second rotary element designated as stator, which rotary elements are arranged at least partly coaxially to one another and so as to be rotatable about a first rotation axis $D_1$, characterized in that a third rotary element designated as second rotor (41) is arranged at least partly coaxially to a part (39) of the stator (38) and so as to be rotatable relative to said stator (38) about a second rotation axis $D_2$ different from the first rotation axis $D_1$ and at least one of the rotary elements have at least two fluid lines and at least one of the first rotor, second rotor and stator have an internal or external annular groove.

2. The rotary transmission leadthrough of claim 1, wherein said annular groove is an annular segment groove.

3. The rotary transmission leadthrough of claim 1 or 2 wherein said stator (38) is a multi-piece.

4. The rotary transmission leadthrough of claim 1 or 2 wherein a pressure-tight flanged joint is provided between different parts of the stator.

5. The rotary transmission leadthrough of claim 1 or 2 wherein at least one rotor is partly in a sleeve shape and encloses a corresponding part of the stator (38).

6. The rotary transmission leadthrough of claim 1 or 2 wherein a third rotor (42) is arranged so as to be rotatable about the second rotation axis $D_2$ of the second rotor (41).

7. The rotary transmission leadthrough of claim 1 or 2 wherein the second and a third rotor (41, 42) are arranged on both sides of the stator (38), to provide a T shape or cross shape of the rotary transmission leadthrough (36).

8. The rotary transmission leadthrough of claim 1 or 2 wherein a leakage-fluid return is provided in the rotary transmission leadthrough.

9. The rotary transmission leadthrough of claim 1 or 2 wherein a leakage-fluid return is arranged between a high-pressure line and an axially displaced region of the rotary transmission leadthrough.

10. The rotary transmission leadthrough of claim 1 or 2 disposed in a machine.

11. The rotary transmission leadthrough of claim 1 or 2 disposed in a vehicle.

* * * * *